(12) United States Patent
Matsusue

(10) Patent No.: US 11,799,108 B2
(45) Date of Patent: Oct. 24, 2023

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/653,348

(22) Filed: Mar. 3, 2022

(65) Prior Publication Data

US 2022/0285711 A1 Sep. 8, 2022

(30) Foreign Application Priority Data

Mar. 4, 2021 (JP) ................. 2021-034290

(51) Int. Cl.
| | |
|---|---|
| H01M 8/04746 | (2016.01) |
| H01M 8/0438 | (2016.01) |
| H01M 8/0444 | (2016.01) |
| H01M 8/04664 | (2016.01) |
| H01M 8/04313 | (2016.01) |
| H01M 8/043 | (2016.01) |
| H01M 8/04791 | (2016.01) |

(52) U.S. Cl.
CPC ... *H01M 8/04753* (2013.01); *H01M 8/04395* (2013.01); *H01M 8/043* (2016.02); *H01M 8/04313* (2013.01); *H01M 8/04388* (2013.01); *H01M 8/04447* (2013.01); *H01M 8/04671* (2013.01); *H01M 8/04679* (2013.01); *H01M 8/04798* (2013.01); *H01M 2220/20* (2013.01); *H01M 2250/10* (2013.01); *H01M 2250/20* (2013.01)

(58) Field of Classification Search
CPC ......... H01M 8/04753; H01M 8/04302; H01M 8/04313; H01M 8/04089; H01M 8/04097; H01M 8/0438; H01M 8/04225; H01M 8/043; H01M 8/04388; H01M 8/0444; H01M 8/04447; H01M 8/04664; H01M 8/04671; H01M 8/04679; H01M 8/04746; H01M 8/04791; H01M 8/04798; H01M 2250/10; H01M 2250/20
See application file for complete search history.

(56) References Cited

FOREIGN PATENT DOCUMENTS

| | | | |
|---|---|---|---|
| JP | 2004296351 A | | 10/2004 |
| JP | 2007165103 | * | 6/2007 |
| JP | 2007165103 A | | 6/2007 |

* cited by examiner

*Primary Examiner* — Matthew W Van Oudenaren
(74) *Attorney, Agent, or Firm* — Dickinson Wright, PLLC

(57) ABSTRACT

To provide a fuel cell system configured to suppress irreversible performance degradation of a fuel cell. A fuel cell system wherein the controller preliminarily stores a data group indicating a relationship between, when a predetermined amount of hydrogen gas is supplied from the fuel gas supplier, an amount of the supplied hydrogen gas and a hydrogen pressure increase rate; wherein the controller calculates a fuel gas pressure increase rate from a pressure change detected by the pressure sensor when the fuel gas is supplied to the fuel cell; wherein the controller determines whether or not the fuel gas pressure increase rate is smaller than the hydrogen pressure increase rate; and wherein, when the controller determines that the fuel gas pressure increase rate is smaller than the hydrogen pressure increase rate, the controller prohibits power generation of the fuel cell.

4 Claims, 9 Drawing Sheets

FUEL CELL SYSTEM

TECHNICAL FIELD

The disclosure relates to a fuel cell system.

BACKGROUND

A fuel cell (FC) is a power generation device that generates electrical energy by electrochemical reaction between fuel gas (e.g., hydrogen) and oxidant gas (e.g., oxygen) in a single unit fuel cell or a fuel cell stack (hereinafter, it may be referred to as "stack") composed of stacked unit fuel cells (hereinafter may be referred to as "cell"). In many cases, the fuel gas and oxidant gas actually supplied to the fuel cell, are mixtures with gases that do not contribute to oxidation and reduction. Especially, the oxidant gas is often air containing oxygen.

Hereinafter fuel gas and oxidant gas may be collectively and simply referred to as "reaction gas" or "gas". Also, a single unit fuel cell and a fuel cell stack composed of stacked unit cells may be referred to as "fuel cell".

In general, the unit fuel cell includes a membrane-electrode assembly (MEA).

The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separators have a structure such that a groove is formed as a reaction gas flow path on a surface in contact with the gas diffusion layer. The separators have electronic conductivity and function as a collector of generated electricity.

In the fuel electrode (anode) of the fuel cell, hydrogen ($H_2$) as the fuel gas supplied from the gas flow path and the gas diffusion layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode reacts with protons and electrons in the catalytic layer of the cathode, thereby generating water. The generated water gives appropriate humidity to the electrolyte membrane, and excess water penetrates the gas diffusion layer and then is discharged to the outside of the system.

Various studies have been made on fuel cell systems configured to be installed and used in fuel cell electric vehicles (hereinafter may be referred to as "vehicle").

For example, Patent Literature 1 discloses a fuel cell system configured to shorten the starting time.

Patent Literature 2 discloses a fuel cell system configured to suppress useless operation of a compressor and so on and useless consumption of hydrogen when the system is started.

Patent Literature 1: Japanese Patent Application Laid-Open (JP-A) No. 2007-165103

Patent Literature 2: JP-A No. 2004-296351

Efficient power generation of a fuel cell cannot be achieved when impurity gas is contained in hydrogen-containing fuel gas; moreover, irreversible performance degradation is caused by catalyst degradation. Accordingly, it is important to control the purity of the fuel gas in the fuel cell.

In the future, if hydrogen stations become popular and the number of hydrogen stations increases, there is a possibility of the appearance of hydrogen stations that provide fuel gas with low hydrogen purity. In addition, there is a possibility that poor quality gas containing large amounts of impurity gas is filled into the fuel gas tank of fuel cell electric vehicles. When poor quality gas is filled into the fuel gas tank of fuel cell electric vehicles, it is needed to detect the gas before the power generation of the fuel cell and to prevent irreversible performance degradation of the fuel cell.

In the prior-art, fuel cell control at the time of power generation is changed by estimating the partial pressure of impurity gas other than hydrogen in the fuel cell, for example. Also in the prior-art, the condition of the hydrogen in the fuel gas in the fuel gas tank is not preliminarily detected, and there is a possibility that irreversible performance degradation of the fuel cell is caused by supplying poor quality gas to the fuel cell. Also in the prior-art, abnormal hydrogen purity of the fuel gas in the fuel gas tank cannot be detected before power generation.

SUMMARY

The disclosed embodiments were achieved in light of the above circumstances. An object of the disclosed embodiments is to provide a fuel cell system configured to suppress irreversible performance degradation of a fuel cell.

The fuel cell system of the disclosed embodiments is a fuel cell system, wherein the fuel cell system comprises:

a fuel cell, a fuel gas supplier for supplying hydrogen-containing fuel gas to the fuel cell, a fuel gas supply flow path connecting a fuel gas inlet of the fuel cell and the fuel gas supplier, a pressure sensor disposed in the fuel gas supply flow path, a fuel off-gas discharge flow path for discharging, to the outside of the fuel cell system, the fuel off-gas discharged from a fuel gas outlet of the fuel cell, a vent and discharge valve disposed in the fuel off-gas discharge flow path, and a controller, wherein the controller preliminarily stores a data group indicating a relationship between, when a predetermined amount of hydrogen gas is supplied from the fuel gas supplier, an amount of the supplied hydrogen gas and a hydrogen pressure increase rate;

wherein the controller calculates a fuel gas pressure increase rate from a pressure change detected by the pressure sensor when the fuel gas is supplied to the fuel cell;

wherein the controller determines whether or not the fuel gas pressure increase rate is smaller than the hydrogen pressure increase rate; and wherein, when the controller determines that the fuel gas pressure increase rate is smaller than the hydrogen pressure increase rate, the controller prohibits power generation of the fuel cell.

In the fuel cell system of the disclosed embodiments, the controller preliminarily may store a data group indicating a hydrogen pressure after an elapse of a predetermined period of time when the predetermined amount of hydrogen gas is supplied from the fuel gas supplier; when the controller determines that the fuel gas pressure increase rate is smaller than the hydrogen pressure increase rate, the controller may determine whether or not the fuel gas pressure after the elapse of the predetermined period of time is smaller than the hydrogen pressure after the elapse of the predetermined period of time; and when the controller determines that the fuel gas pressure after the elapse of the predetermined period of time is smaller than the hydrogen pressure after the elapse of the predetermined period of time, the controller may prohibit power generation of the fuel cell.

The fuel cell system of the disclosed embodiments is a fuel cell system,
wherein the fuel cell system comprises:
a fuel cell,
a fuel gas supplier for supplying hydrogen-containing fuel gas to the fuel cell,
a fuel gas supply flow path connecting a fuel gas inlet of the fuel cell and the fuel gas supplier,
a pressure sensor disposed in the fuel gas supply flow path,
a fuel off-gas discharge flow path for discharging, to the outside of the fuel cell system, the fuel off-gas discharged from a fuel gas outlet of the fuel cell,
a vent and discharge valve disposed in the fuel off-gas discharge flow path, and
a controller,
wherein the controller preliminarily stores a data group indicating a hydrogen pressure after an elapse of a predetermined period of time when a predetermined amount of hydrogen gas is supplied from the fuel gas supplier;
wherein the controller determines whether or not the fuel gas pressure after the elapse of the predetermined period of time is smaller than the hydrogen pressure after the elapse of the predetermined period of time; and
wherein, when the controller determines that the fuel gas pressure after the elapse of the predetermined period of time is smaller than the hydrogen pressure after the elapse of the predetermined period of time, the controller prohibits power generation of the fuel cell.

In the fuel cell system of the disclosed embodiments, the controller may preliminarily store a data group indicating a relationship between, when the predetermined amount of hydrogen gas is supplied from the fuel gas supplier, an amount of the supplied hydrogen gas and a hydrogen pressure increase rate; when the controller determines that the fuel gas pressure after the elapse of the predetermined period of time is smaller than a predetermined threshold, the controller may calculate a fuel gas pressure increase rate from a pressure change detected by the pressure sensor when the fuel gas is supplied to the fuel cell; the controller may determine whether or not the fuel gas pressure increase rate is smaller than the hydrogen pressure increase rate; and when the controller determines that the fuel gas pressure increase rate is smaller than the hydrogen pressure increase rate, the controller may prohibit power generation of the fuel cell.

By the fuel cell system of the disclosed embodiments, the irreversible performance degradation of the fuel cell is suppressed.

BRIEF DESCRIPTION OF THE DRAWINGS

In the accompanying drawings.

DETAILED DESCRIPTION

The fuel cell system of the disclosed embodiments is a fuel cell system,
wherein the fuel cell system comprises:
a fuel cell,
a fuel gas supplier for supplying hydrogen-containing fuel gas to the fuel cell,
a fuel gas supply flow path connecting a fuel gas inlet of the fuel cell and the fuel gas supplier,
a pressure sensor disposed in the fuel gas supply flow path,
a fuel off-gas discharge flow path for discharging, to the outside of the fuel cell system, the fuel off-gas discharged from a fuel gas outlet of the fuel cell,
a vent and discharge valve disposed in the fuel off-gas discharge flow path, and
a controller,
wherein the controller preliminarily stores a data group indicating a relationship between, when a predetermined amount of hydrogen gas is supplied from the fuel gas supplier, an amount of the supplied hydrogen gas and a hydrogen pressure increase rate;
wherein the controller calculates a fuel gas pressure increase rate from a pressure change detected by the pressure sensor when the fuel gas is supplied to the fuel cell;
wherein the controller determines whether or not the fuel gas pressure increase rate is smaller than the hydrogen pressure increase rate; and
wherein, when the controller determines that the fuel gas pressure increase rate is smaller than the hydrogen pressure increase rate, the controller prohibits power generation of the fuel cell.

Figure 1:
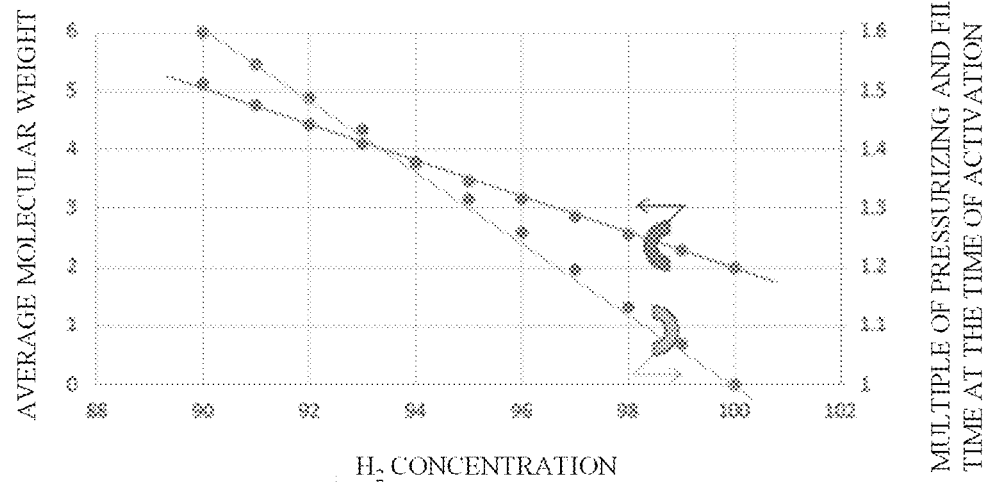
FIG. 1 is a view showing an example of the relationship between the concentration of hydrogen, the molecular weight of hydrogen gas, and the multiple of the time required to fill pressurized fuel gas into the fuel cell when the fuel cell system is activated.

FIG. 1 is a view showing an example of the relationship between the concentration of hydrogen, the molecular weight of hydrogen gas, and the multiple of the time required to fill pressurized fuel cell into the fuel cell when the fuel cell system is activated.

As shown in FIG. 1, it was found that if impurity gas other than hydrogen is contained in fuel gas, since hydrogen has the smallest molecular weight among gases and has small density, the density of the fuel gas is increased, thereby decreasing the flow rate of fuel gas injected from the fuel gas supplier and decreasing the gas pressure increase rate. At the time of introducing the fuel gas to the fuel cell from the fuel gas supplier, the flow rate of the fuel gas injected from the fuel gas supplier varies according to the presence or absence of an impurity in the fuel gas. Accordingly, the presence or absence of an impurity can be detected by a difference in pressure increase rate from the start of fuel gas supply to the fuel cell.

According to the fuel cell system of the disclosed embodiments, even when poor quality gas containing large amounts of impurity gas is filled into the fuel gas supplier, it can be detected before the power generation of the fuel cell.

Using the phenomenon that the gas pressure increase rate varies depending on the type of the gas when the fuel gas is supplied from the fuel gas supplier to the fuel cell at the time of activating the fuel cell system, the fuel gas system of the disclosed embodiments detects impurity gas, estimates the amount of an impurity, and prohibits the power generation of the fuel cell when the amount of the impurity is estimated to be large.

The fuel cell system of the disclosed embodiments can suppress hydrogen deficiency in the fuel cell by detecting the impurity gas before the power generation of the fuel cell and prohibiting the power generation of the fuel cell.

In the disclosed embodiments, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

In the disclosed embodiments, the impurity may be nitrogen, carbon monoxide, hydrogen sulfide or the like.

In general, the fuel cell system of the disclosed embodiments is installed and used in a vehicle including a motor as a driving source.

The fuel cell system of the disclosed embodiments may be installed and used in a vehicle that can be run by the power of a secondary cell.

The motor is not particularly limited, and it may be a conventionally-known driving motor.

The vehicle may be a fuel cell electric vehicle.

The vehicle may include the fuel cell system of the disclosed embodiments.

The fuel cell system of the disclosed embodiments includes the fuel cell.

The fuel cell may be a fuel cell composed of a single unit fuel cell, or it may be a fuel cell stack composed of stacked unit fuel cells.

The number of the stacked unit fuel cells is not particularly limited. For example, 2 to several hundred unit fuel cells may be stacked, or 2 to 300 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum, (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the disclosed embodiments, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

The fuel cell system includes, as the fuel gas system of the fuel cell, the fuel gas supplier, the fuel gas supply flow path, the pressure sensor, the fuel off-gas discharge flow path, the vent and discharge valve, and the controller.

The fuel gas supplier supplies the hydrogen-containing fuel gas to the fuel cell. More specifically, the fuel gas supplier supplies the hydrogen-containing fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas inlet of the fuel cell and the fuel gas supplier. The fuel gas supply flow path allows the fuel gas to be supplied to the anode of the fuel cell. The fuel gas inlet may be the fuel gas supply hole, the anode inlet manifold or the like.

The pressure sensor disposed in the fuel gas supply flow path.

The pressure sensor measures the pressure of the fuel gas supplied to the fuel cell. The pressure sensor is electrically connected to the controller, and the controller detects the fuel gas pressure measured by the pressure sensor.

As the pressure sensor, a conventionally-known pressure meter or the like may be used.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The vent and discharge valve (the fuel off-gas discharge valve) is disposed in the fuel off-gas discharge flow path.

The vent and discharge valve allows the fuel off-gas, water and the like to be discharged to the outside (of the system). The outside may be the outside of the fuel cell system, or it may be the outside of the vehicle.

The vent and discharge valve may be electrically connected to the controller, and the flow rate of the fuel off-gas discharged to the outside may be controlled by controlling the opening and closing of the vent and discharge valve by the controller. By controlling the opening degree of the vent and discharge valve, the pressure of the fuel gas supplied to the anode of the fuel cell (anode pressure) may be controlled.

The fuel off-gas may include the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The fuel cell system may include a circulation flow path.

The circulation flow path allows the fuel off-gas, which is the fuel gas discharged from the fuel gas outlet of the fuel cell, to be recovered and supplied to the fuel cell as the circulation gas.

The circulation flow path may branch from the fuel off-gas discharge flow path and join the fuel gas supply flow path.

The circulation flow path may branch from the fuel off-gas discharge flow path and connect to an ejector that may be disposed in the fuel gas supply flow path.

The circulation flow path may branch from the fuel off-gas discharge flow path through the gas-liquid separator and connect to the ejector disposed in the fuel gas supply flow path, thereby joining the fuel gas supply flow path.

For example, the ejector may be disposed at a junction with the circulation flow path on the fuel gas supply flow path. The ejector supplies a mixed gas containing the fuel gas and circulation gas to the anode of the fuel cell. As the ejector, a conventionally-known ejector may be used.

In the fuel cell system, as needed, a circulation pump (such as a hydrogen pump for controlling the flow rate of the circulation gas) or the like may be disposed on the circulation flow path.

The circulation pump may be electrically connected to the controller, and the flow rate of the circulation gas may be controlled by controlling the turning on/off, rotational frequency, etc., of the circulation pump by the controller.

The fuel cell system may include an anode gas-liquid separator.

The anode gas-liquid separator may be disposed at the branch point of the fuel off-gas discharge flow path and the circulation flow path. In this case, the vent and discharge valve of the fuel off-gas discharge flow path may be disposed downstream from the anode gas-liquid separator. The anode gas-liquid separator separates the water and fuel gas contained in the fuel off-gas, which is the fuel gas discharged from the fuel gas outlet. Accordingly, the fuel gas may be returned to the circulation flow path as the circulation gas, or unnecessary gas, water and the like may be discharged to the outside by opening the vent and discharge valve of the fuel off-gas discharge flow path. In addition, the anode gas-liquid separator can suppress the flow of excess water into the circulation flow path. Accordingly, the occurrence of freezing of the circulation pump or the like due to the water, can be suppressed.

As the oxidant gas system of the fuel cell, the fuel cell system may include an oxidant gas supplier, an oxidant gas supply flow path, and an oxidant off-gas discharge flow path.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is driven according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The fuel cell system may include a refrigerant supplier and a refrigerant circulation flow path as the cooling system of the fuel cell.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is driven according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

The fuel cell system may include a secondary cell.

The secondary cell (battery) may be any chargeable and dischargeable cell. For example, the secondary cell may be a conventionally known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier and the like. The secondary cell may be rechargeable by a power source outside the vehicle, such as a household power supply. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be installed in the vehicle. The controller may be operable by an external power supply even if the ignition switch is turned off.

(1) First Embodiment

The controller preliminarily stores the data group indicating the relationship between, when the predetermined amount of hydrogen gas is supplied from the fuel gas supplier, the amount of the supplied hydrogen gas and the hydrogen pressure increase rate.

The controller calculates the fuel gas pressure increase rate from the pressure change detected by the pressure sensor when the fuel gas is supplied to the fuel cell.

The controller determines whether or not the fuel gas pressure increase rate is smaller than the hydrogen pressure increase rate.

When the controller determines that the fuel gas pressure increase rate is smaller than the hydrogen pressure increase rate, the controller prohibits the power generation of the fuel cell.

(2) Second Embodiment

The controller preliminarily stores the data group indicating the hydrogen pressure after the elapse of the predetermined period of time when the predetermined amount of hydrogen gas is supplied from the fuel gas supplier.

The controller determines whether or not the fuel gas pressure after the elapse of the predetermined period of time is smaller than the hydrogen pressure after the elapse of the predetermined period of time.

When the controller determines that the fuel gas pressure after the elapse of the predetermined period of time is smaller than the hydrogen pressure after the elapse of the predetermined period of time, the controller prohibits the power generation of the fuel cell.

Figure 2:
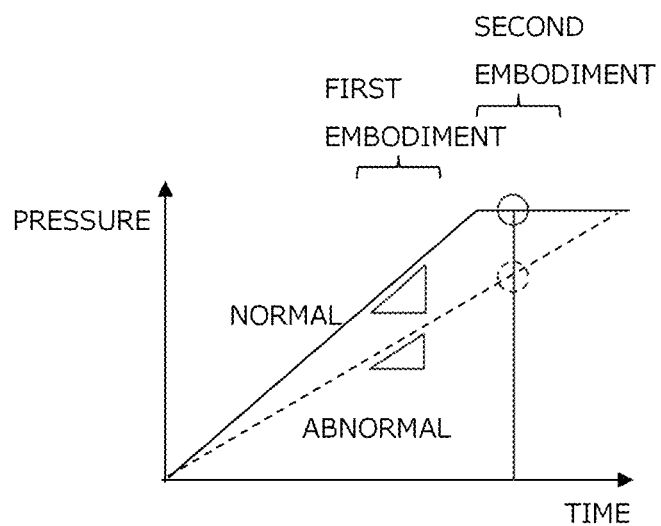
FIG. 2 is a view showing an example of the relationship between the pressure of normal fuel gas that does not contain impurity gas and the spraying time of the normal fuel gas to the fuel cell, and an example of the relationship between the pressure of abnormal fuel gas that contains impurity gas and the spraying time of the abnormal fuel gas to the fuel cell.

FIG. 2 is a view showing an example of the relationship between the pressure of normal fuel gas that does not contain impurity gas and the spraying time of the normal fuel gas to the fuel cell, and an example of the relationship between the pressure of abnormal fuel gas that contains impurity gas and the spraying time of the abnormal fuel gas to the fuel cell.

In the first embodiment, as shown in FIG. 2, the presence or absence of the impurity gas is determined by a difference in the gradient of the pressure increase rate. In the second embodiment, the presence or absence of the impurity gas is determined by a difference in the pressure after the elapse of the predetermined period of time.

Accordingly, from the viewpoint of increasing the accuracy of determining the presence or absence of the impurity gas, the first and second embodiments may be combined and conducted together. Of the first and second embodiments, the first embodiment may be conducted before the second embodiment, or the second embodiment may be conducted before the first embodiment.

Figure 3:
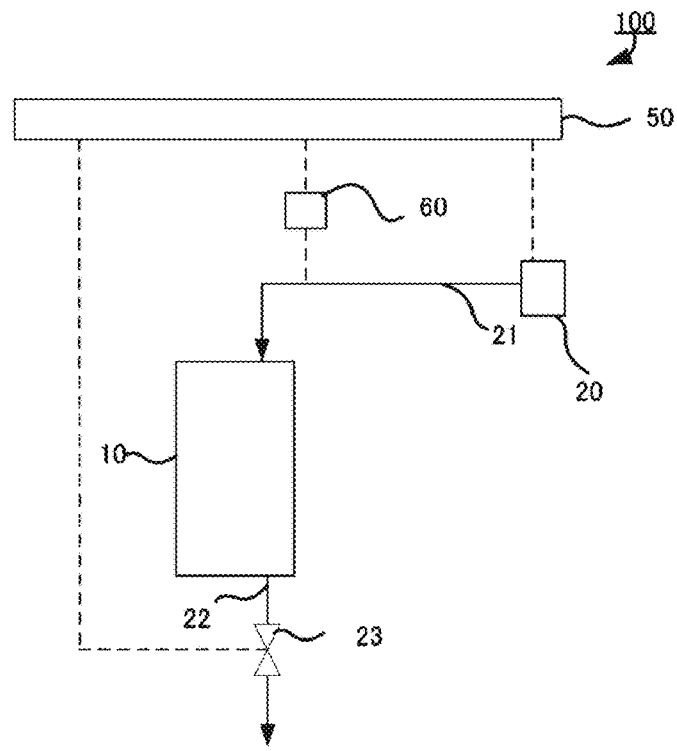
FIG. 3 is a schematic configuration diagram of an example of the fuel cell system of the disclosed embodiments.

FIG. 3 is a schematic configuration diagram of an example of the fuel cell system of the disclosed embodiments.

A fuel cell system 100 shown in FIG. 3 includes a fuel cell 10, a fuel gas supplier 20, a fuel gas supply flow path 21, a fuel off-gas discharge flow path 22, a vent and discharge valve 23, a controller 50, and a pressure sensor 60. In FIG. 3, only the fuel gas system is illustrated, and other systems such as the oxidant gas system and the cooling system are not illustrated.

The pressure sensor 60 is disposed on the fuel gas supply flow path 21, and it measures the value of the fuel gas pressure at the anode inlet. As indicated by a dashed line, the pressure sensor 60 is electrically connected to the controller 50 and sends the measured fuel gas pressure value to the controller 50.

The controller 50 is electrically connected to the fuel gas supplier 20, and it controls the fuel gas supply from the fuel gas supplier 20 based on the result of detecting the fuel gas pressure value.

The controller 50 is electrically connected to the vent and discharge valve 23. As needed, it opens the vent and discharge valve 23 to discharge unnecessary gas, water and the like from the fuel off-gas discharge flow path 22 to the outside.

Figure 4:
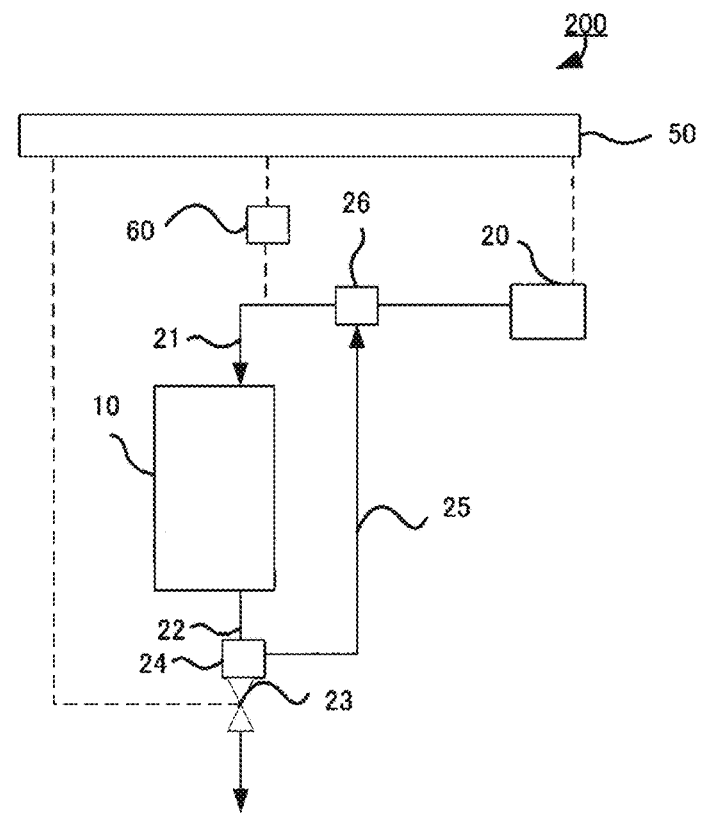
FIG. 4 is a schematic configuration diagram of another example of the fuel cell system of the disclosed embodiments.

FIG. 4 is a schematic configuration diagram of another example of the fuel cell system of the disclosed embodiments.

A fuel cell system 200 shown in FIG. 4 includes a fuel cell 10, a fuel gas supplier 20, a fuel gas supply flow path 21, a fuel off-gas discharge flow path 22, a vent and discharge valve 23, an anode gas-liquid separator 24, a circulation flow path 25, an ejector 26, a controller 50 and a pressure sensor 60. In FIG. 4, only the fuel gas system is illustrated, and other systems such as the oxidant gas system and the cooling system are not illustrated. Of the components shown in FIG. 4, the same components as those shown in FIG. 3 are not described here.

The anode gas-liquid separator 24 is disposed at the branch point of the fuel off-gas discharge flow path 22 and the circulation flow path 25. It separates the fuel gas and water from the fuel off-gas, which is the fuel gas discharged from the anode outlet, and returns the fuel gas to the circulation flow path 25 as the circulation gas.

The ejector 26 is disposed at a junction with the fuel gas supply flow path 21 of the circulation flow path 25.

Figure 5:
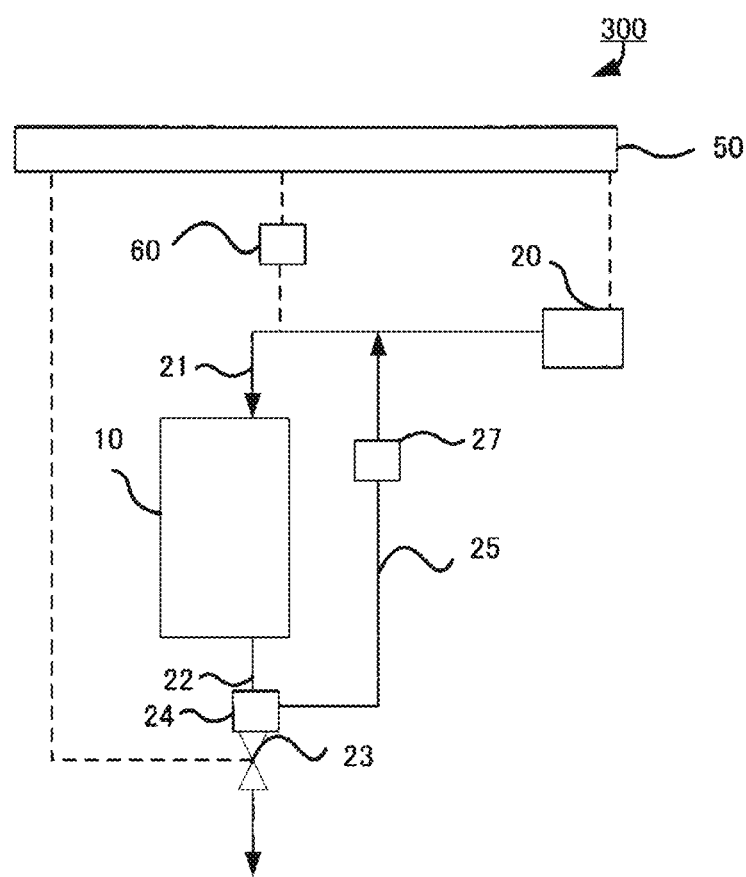
FIG. 5 is a schematic configuration diagram of another example of the fuel cell system of the disclosed embodiments.

FIG. 5 is a schematic configuration diagram of another example of the fuel cell system of the disclosed embodiments. Of the components shown in FIG. 5, the same components as those shown in FIG. 4 are not described here.

Compared to the fuel cell system 200 shown in FIG. 4, in a fuel cell system 300 shown in FIG. 5, a circulation pump 27 is disposed in the circulation flow path 25, instead of disposing the ejector 26 at the junction with the fuel gas supply flow path 21 of the circulation flow path 25. The ejector 26 may be disposed at the junction with the fuel gas supply flow path 21 of the circulation flow path 25.

Figure 6:
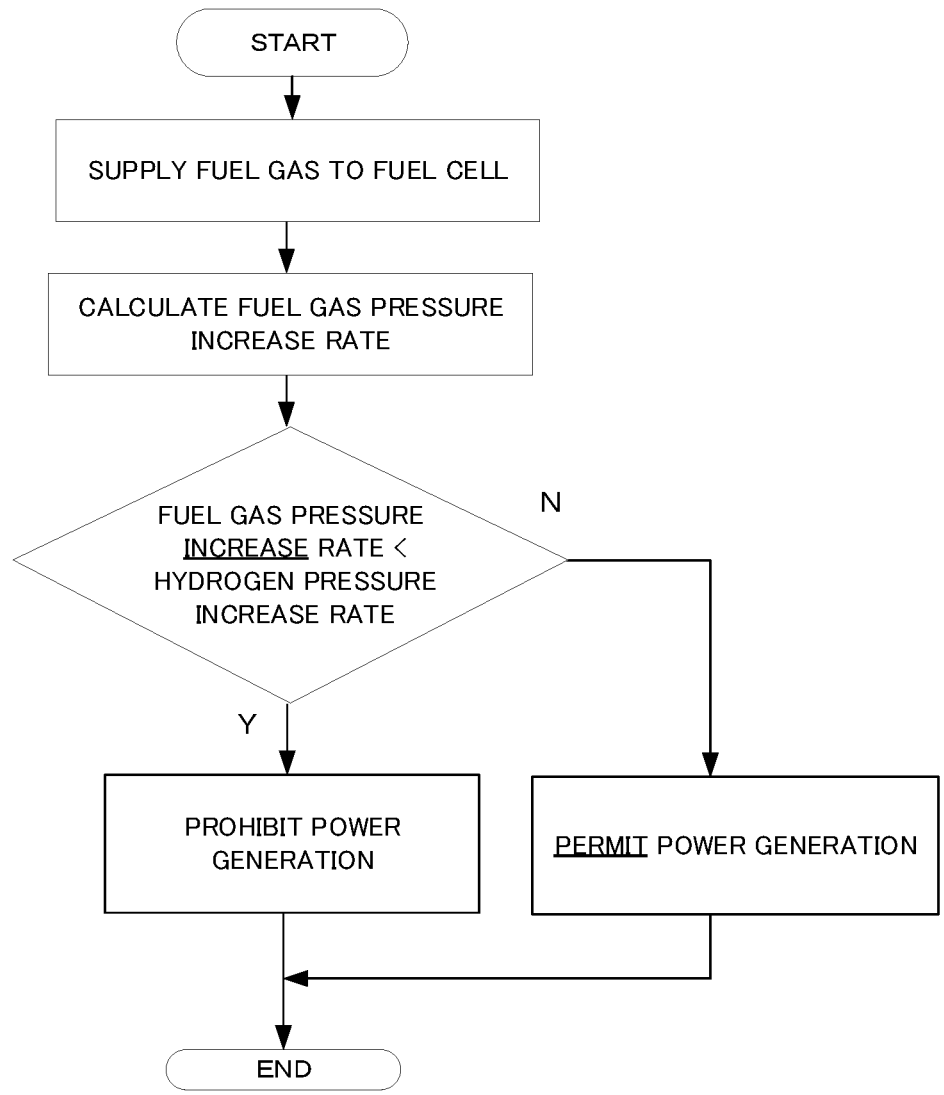
FIG. 6 is a flowchart illustrating an example of the control of the fuel cell system of the disclosed embodiments.

FIG. 6 is a flowchart illustrating an example of the control of the fuel cell system of the disclosed embodiments.

(A) First Embodiment

The controller supplies the predetermined amount of fuel gas to the fuel cell. The timing to supply the fuel gas to the fuel cell may be, for example, after the fuel gas is supplied to the fuel gas supplier.

The controller calculates the fuel gas pressure increase rate from the pressure change detected by the pressure sensor.

The controller determines whether or not the fuel gas pressure increase rate is smaller than the preliminarily stored hydrogen pressure increase rate.

When the controller determines that the fuel gas pressure increase rate is smaller than the hydrogen pressure increase rate, the controller prohibits the power generation of the fuel cell. When the fuel gas pressure increase rate is smaller than the hydrogen pressure increase rate, since the impurity gas is contained in the fuel gas, the irreversible performance degradation of the fuel cell can be suppressed by prohibiting the power generation of the fuel cell.

On the other hand, when the controller determines that the fuel gas pressure increase rate is equal to or more than the hydrogen pressure increase rate, the controller permits the power generation of the fuel cell.

Figure 7:
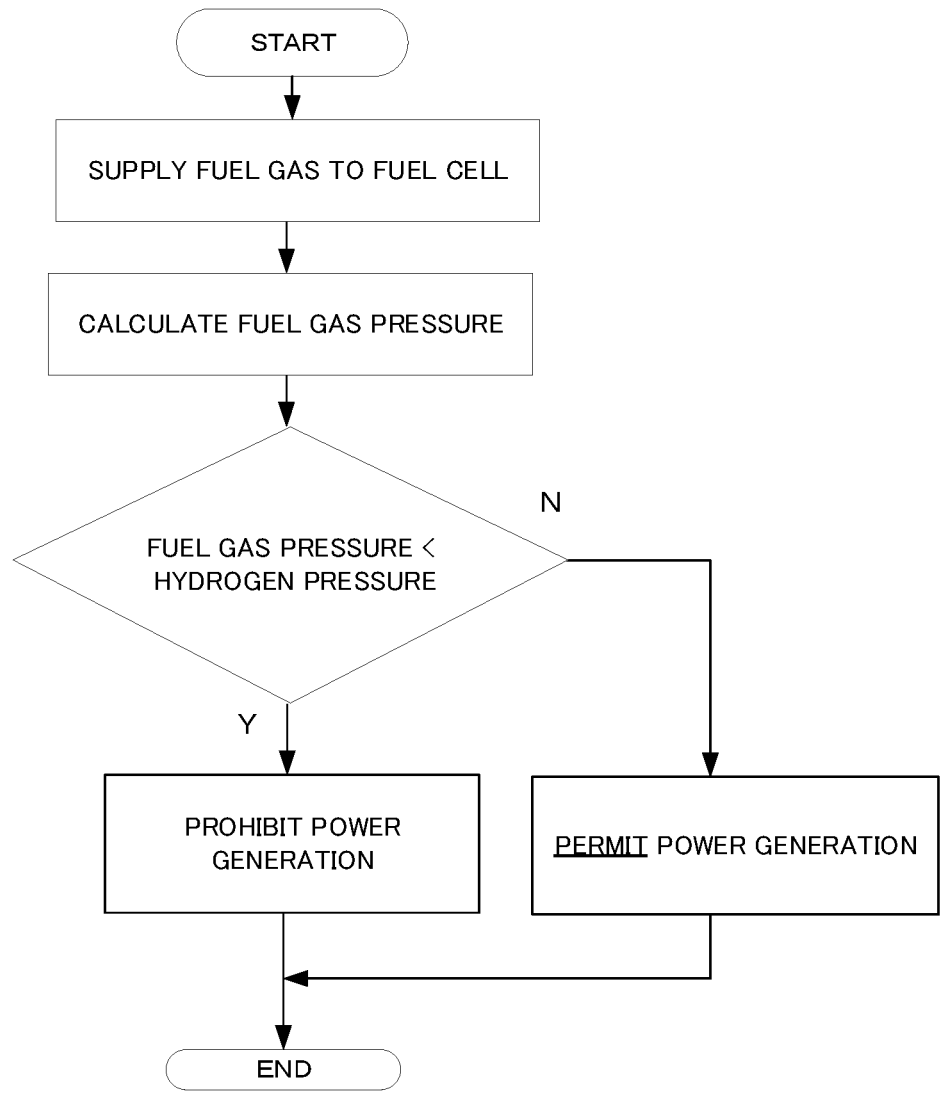
FIG. 7 is a flowchart illustrating another example of the control of the fuel cell system of the disclosed embodiments.

FIG. 7 is a flowchart illustrating another example of the control of the fuel cell system of the disclosed embodiments.

(B) Second Embodiment

The controller supplies the predetermined amount of fuel gas to the fuel cell.

Using the pressure sensor, the fuel gas pressure after the elapse of the predetermined period of time, is detected by the controller.

The controller determines whether or not the fuel gas pressure after the elapse of the predetermined period of time is smaller than the preliminarily stored hydrogen pressure after the elapse of the predetermined period of time.

When the controller determines that the fuel gas pressure after the elapse of the predetermined period of time is smaller than the preliminarily stored hydrogen pressure after the elapse of the predetermined period of time, the controller prohibits the power generation of the fuel cell. When the fuel gas pressure after the elapse of the predetermined period of time is smaller than the hydrogen pressure after the elapse of the predetermined period of time, since the impurity gas is contained in the fuel gas, the irreversible performance degradation of the fuel cell can be suppressed by prohibiting the power generation of the fuel cell.

On the other hand, when the controller determines that the fuel gas pressure after the elapse of the predetermined period of time is equal to or more than the preliminarily stored hydrogen pressure after the elapse of the predetermined period of time, the controller permits the power generation of the fuel cell.

Figure 8:
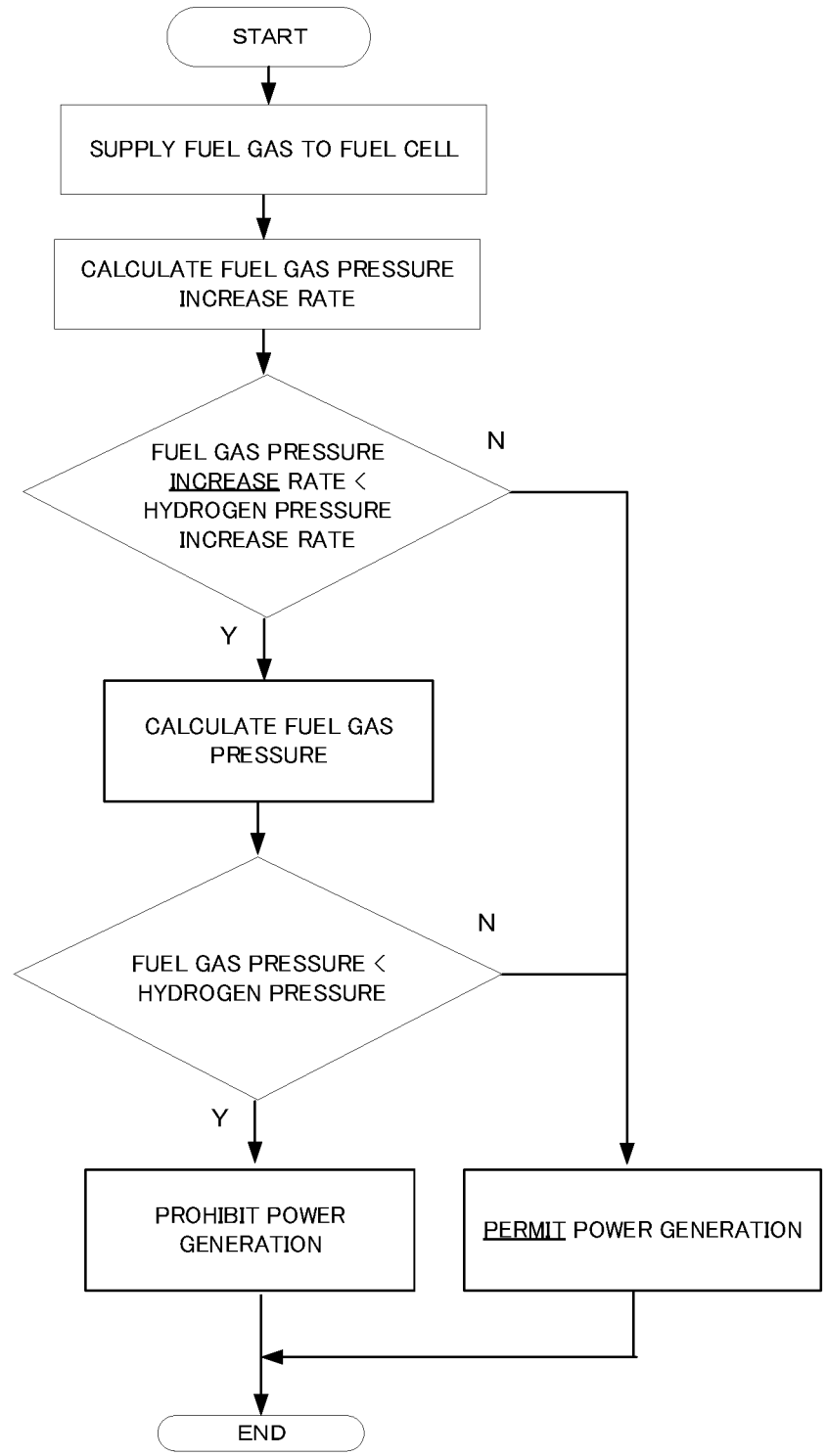
FIG. 8 is a flowchart illustrating another example of the control of the fuel cell system of the disclosed embodiments.

FIG. 8 is a flowchart illustrating another example of the control of the fuel cell system of the disclosed embodiments.

(C) First Embodiment and Second Embodiment

The controller supplies the predetermined amount of fuel gas to the fuel cell.

The controller calculates the fuel gas pressure increase rate from the pressure change detected by the pressure sensor.

The controller determines whether or not the fuel gas pressure increase rate is smaller than the preliminarily stored hydrogen pressure increase rate.

When the controller determines that the fuel gas pressure increase rate is equal to or more than the hydrogen pressure increase rate, the controller permits the power generation of the fuel cell.

On the other hand, when the controller determines that the fuel gas pressure increase rate is smaller than the hydrogen pressure increase rate, the fuel gas pressure after the elapse of the predetermined period of time is detected by the controller, using the pressure sensor.

The controller determines whether or not the fuel gas pressure after the elapse of the predetermined period of time is smaller than the preliminarily stored hydrogen pressure after the elapse of the predetermined period of time.

When the controller determines that the fuel gas pressure after the elapse of the predetermined period of time is smaller than the preliminarily stored hydrogen pressure after the elapse of the predetermined period of time, the controller prohibits the power generation of the fuel cell.

On the other hand, when the controller determines that the fuel gas pressure after the elapse of the predetermined period of time is equal to or more than the preliminarily stored hydrogen pressure after the elapse of the predetermined period of time, the controller permits the power generation of the fuel cell.

By combining the first embodiment and the second embodiment, the accuracy of determining the presence or absence of the impurity gas can be increased.

Figure 9:
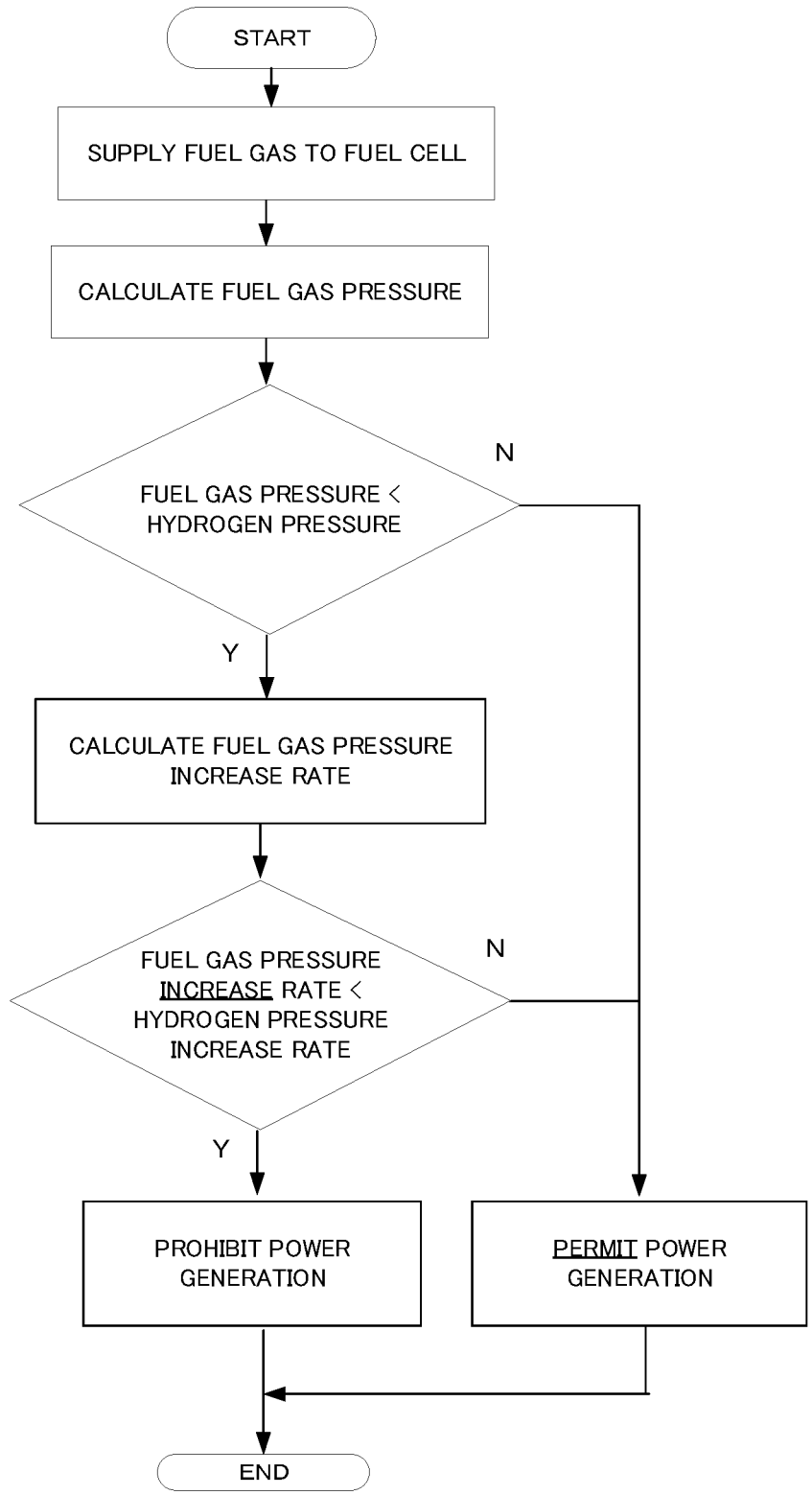
FIG. 9 is a flowchart illustrating another example of the control of the fuel cell system of the disclosed embodiments.

FIG. 9 is a flowchart illustrating another example of the control of the fuel cell system of the disclosed embodiments.

(D) Second Embodiment and First Embodiment

The controller supplies the predetermined amount of fuel gas to the fuel cell.

The fuel gas pressure after the elapse of the predetermined period of time is detected by the controller, using the pressure sensor.

The controller determines whether or not the fuel gas pressure after the elapse of the predetermined period of time is smaller than the preliminarily stored hydrogen pressure after the elapse of the predetermined period of time.

When the controller determines that the fuel gas pressure after the elapse of the predetermined period of time is equal to or more than the preliminarily stored hydrogen pressure after the elapse of the predetermined period of time, the controller permits the power generation of the fuel cell.

On the other hand, when the controller determines that the fuel gas pressure after the elapse of the predetermined period of time is smaller than the preliminarily stored hydrogen pressure after the elapse of the predetermined period of time, the controller calculates the fuel gas pressure increase rate from the pressure change detected by the pressure sensor.

The controller determines whether or not the fuel gas pressure increase rate is smaller than the preliminarily stored hydrogen pressure increase rate.

When the controller determines that the fuel gas pressure increase rate is smaller than the hydrogen pressure increase rate, the controller prohibits the power generation of the fuel cell.

On the other hand, when the controller determines that the fuel gas pressure increase rate is equal to or more than the hydrogen pressure increase rate, the controller permits the power generation of the fuel cell.

By combining the second embodiment and the first embodiments, the accuracy of determining the presence or absence of the impurity gas can be increased.

Figure 10:
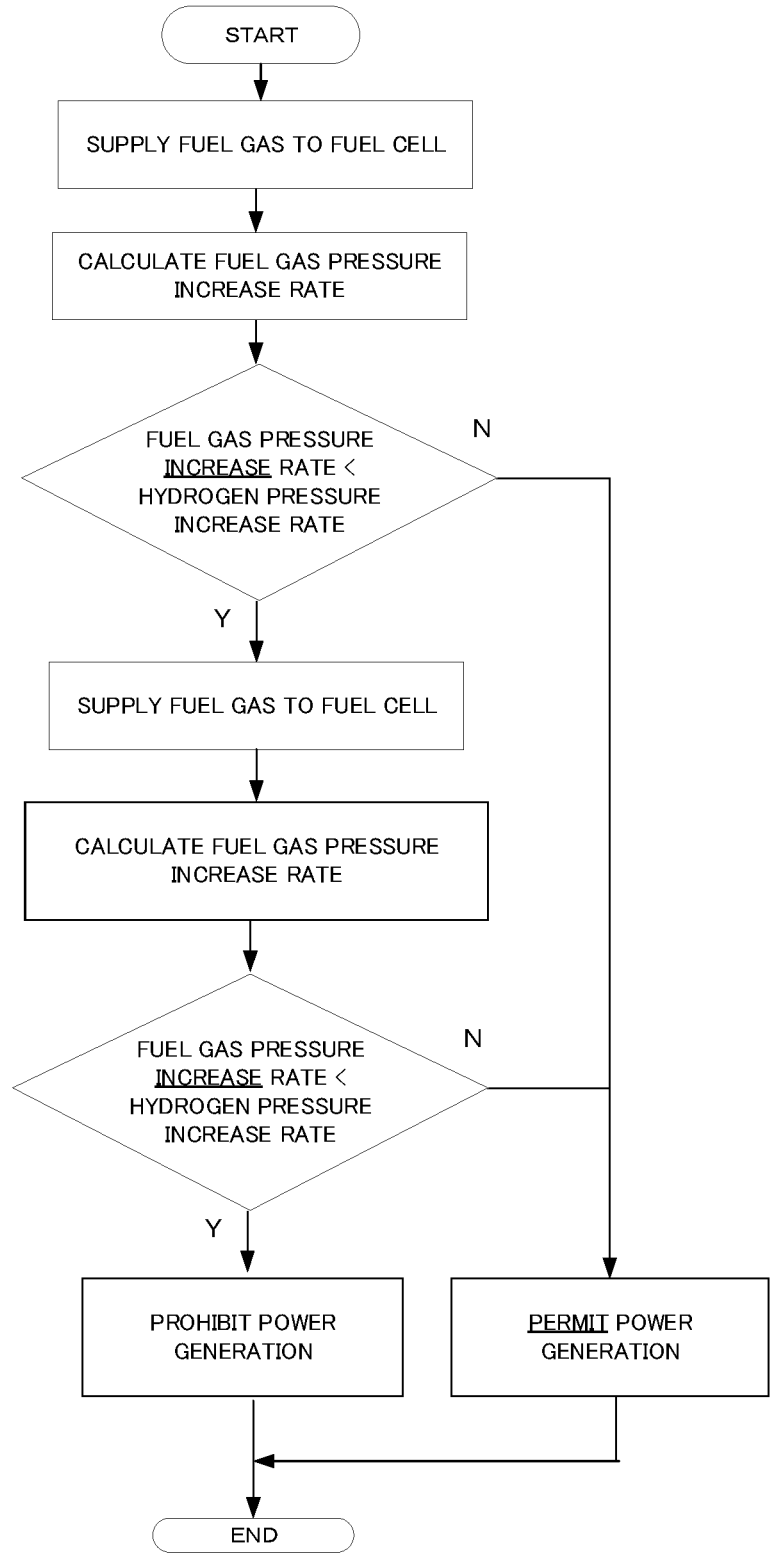
FIG. 10 is a flowchart illustrating another example of the control of the fuel cell system of the disclosed embodiments.

FIG. 10 is a flowchart illustrating another example of the control of the fuel cell system of the disclosed embodiments.

(E) First Embodiment and Second Embodiment

The controller supplies the predetermined amount of fuel gas to the fuel cell.

The controller calculates the fuel gas pressure increase rate from the pressure change detected by the pressure sensor.

The controller determines whether or not the fuel gas pressure increase rate is smaller than the preliminarily stored hydrogen pressure increase rate.

When the controller determines that the fuel gas pressure increase rate is equal to or more than the hydrogen pressure increase rate, the controller permits the power generation of the fuel cell.

On the other hand, when the controller determines that the fuel gas pressure increase rate is smaller than the hydrogen pressure increase rate, the controller suspends the fuel gas supply to the fuel cell, and it supplies the predetermined amount of fuel gas to the fuel cell, again.

The controller calculates the fuel gas pressure increase rate from the pressure change detected by the pressure sensor, again.

The controller determines whether or not the fuel gas pressure increase rate is smaller than the preliminarily stored hydrogen pressure increase rate, again.

When the controller determines that the fuel gas pressure increase rate is equal to or more than the hydrogen pressure increase rate, the controller permits the power generation of the fuel cell.

On the other hand, when the controller determines that the fuel gas pressure increase rate is smaller than the hydrogen pressure increase rate, the controller prohibits the power generation of the fuel cell.

In consideration of the possibility of poor performance of the fuel gas supplier, by retrying the fuel gas supply (i.e., closing the main shutoff valve of the fuel gas supplier and opening the valve again) and then making the determination, the accuracy of determining the presence or absence of the impurity gas can be increased.

Figure 11:
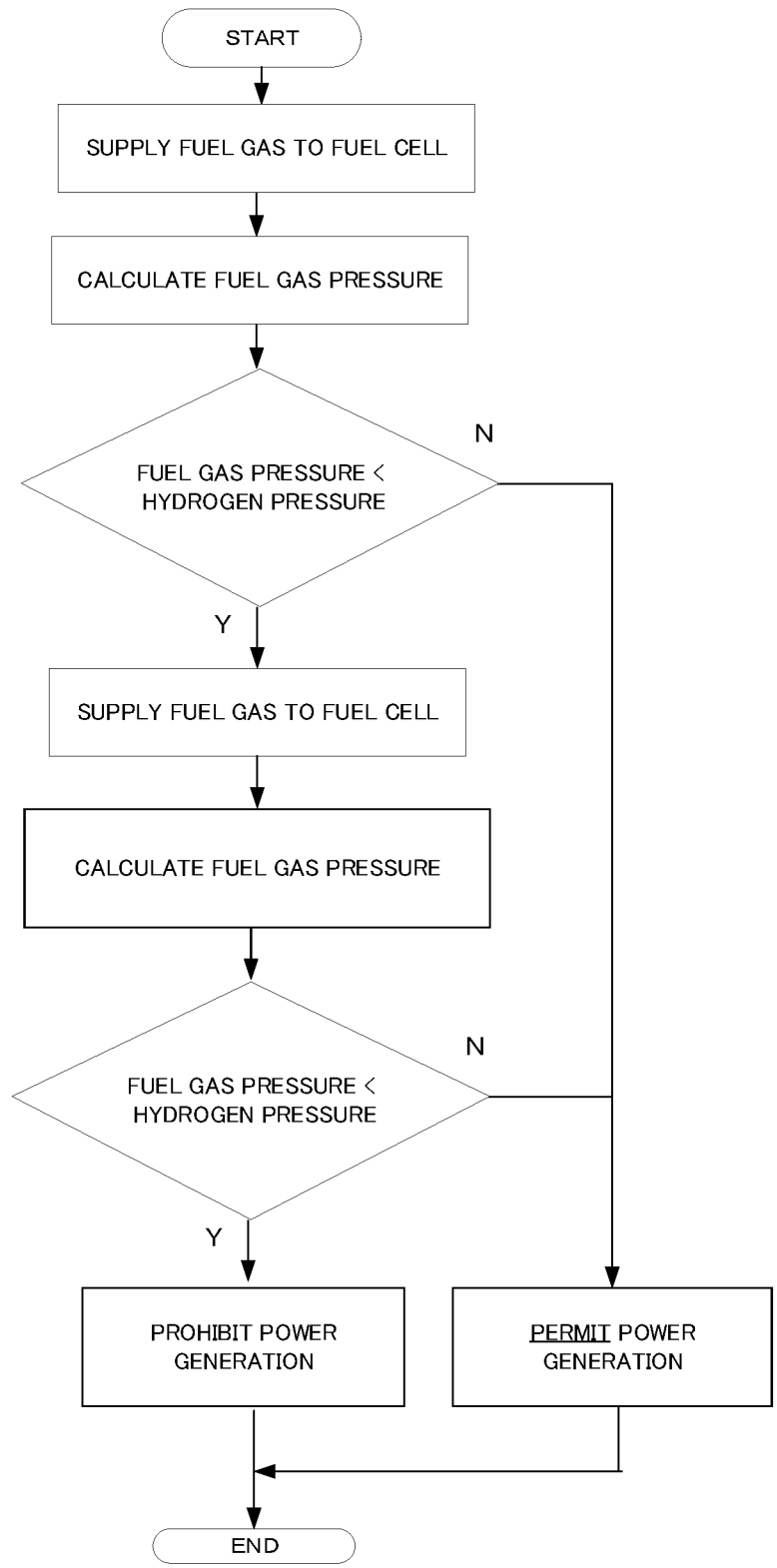
FIG. 11 is a flowchart illustrating another example of the control of the fuel cell system of the disclosed embodiments.

FIG. 11 is a flowchart illustrating another example of the control of the fuel cell system of the disclosed embodiments.

(F) Second Embodiment and Second Embodiment

The controller supplies the predetermined amount of fuel gas to the fuel cell.

the fuel gas pressure after the elapse of the predetermined period of time is detected by the controller, using the pressure sensor.

The controller determines whether or not the fuel gas pressure after the elapse of the predetermined period of time is smaller than the preliminarily stored hydrogen pressure after the elapse of the predetermined period of time.

When the controller determines that the fuel gas pressure after the elapse of the predetermined period of time is equal to or more than the preliminarily stored hydrogen pressure after the elapse of the predetermined period of time, the controller permits the power generation of the fuel cell.

On the other hand, when the controller determines that the fuel gas pressure after the elapse of the predetermined period of time is smaller than the preliminarily stored hydrogen pressure after the elapse of the predetermined period of time, the controller suspends the fuel gas supply to the fuel cell, and it supplies the predetermined amount of fuel gas to the fuel cell, again.

From the pressure change detected by the pressure sensor, the controller calculates the fuel gas pressure after the elapse of the predetermined period of time, again.

The controller determines whether or not the fuel gas pressure after the elapse of the predetermined period of time is smaller than the preliminarily stored hydrogen pressure after the elapse of the predetermined period of time, again.

When the controller determines that the fuel gas pressure after the elapse of the predetermined period of time is equal to or more than the preliminarily stored hydrogen pressure after the elapse of the predetermined period of time, the controller permits the power generation of the fuel cell.

On the other hand, when the controller determines that the fuel gas pressure after the elapse of the predetermined period of time is smaller than the preliminarily stored hydrogen pressure after the elapse of the predetermined period of time, the controller prohibits the power generation of the fuel cell.

In consideration of the possibility of poor performance of the fuel gas supplier, by retrying the fuel gas supply (i.e., closing the main shutoff valve of the fuel gas supplier and opening the valve again) and then making the determination, the accuracy of determining the presence or absence of the impurity gas can be increased.

REFERENCE SIGNS LIST

10: Fuel cell
20: Fuel gas supplier
21: Fuel gas supply flow path
22: Fuel off-gas discharge flow path
23: Vent and discharge valve
24: Anode gas-liquid separator
25: Circulation flow path
26: Ejector
27: Circulation pump
50: Controller
60: Pressure sensor
100: Fuel cell system
200: Fuel cell system
300: Fuel cell system

The invention claimed is:

1. A fuel cell system,
wherein the fuel cell system comprises:
a fuel cell,
a fuel gas supplier for supplying hydrogen-containing fuel gas to the fuel cell,
a fuel gas supply flow path connecting a fuel gas inlet of the fuel cell and the fuel gas supplier,
a pressure sensor disposed in the fuel gas supply flow path,
a fuel off-gas discharge flow path for discharging, to an outside of the fuel cell system, a fuel off-gas discharged from a fuel gas outlet of the fuel cell,
a vent and discharge valve disposed in the fuel off-gas discharge flow path, and
a controller,
wherein the controller is preliminarily programmed to store a data group indicating a relationship between, when a predetermined amount of hydrogen gas is supplied from the fuel gas supplier, an amount of supplied hydrogen gas and a hydrogen pressure increase rate;
wherein the controller calculates a fuel gas pressure increase rate from a pressure change detected by the pressure sensor when the hydrogen-containing fuel gas is supplied to the fuel cell;
wherein the controller is programmed to determine whether or not the fuel gas pressure increase rate is smaller than the hydrogen pressure increase rate; and
wherein, when the controller determines that the fuel gas pressure increase rate is smaller than the hydrogen pressure increase rate, the controller is programmed to prohibit power generation of the fuel cell.

2. The fuel cell system according to claim 1,
wherein the controller is preliminarily programmed to store a data group indicating a hydrogen pressure after an elapse of a predetermined period of time when the predetermined amount of hydrogen gas is supplied from the fuel gas supplier;
wherein, when the controller determines that the fuel gas pressure increase rate is smaller than the hydrogen pressure increase rate, the controller determines whether or not a fuel gas pressure after the elapse of the predetermined period of time is smaller than the hydrogen pressure after the elapse of the predetermined period of time; and
wherein, when the controller determines that the fuel gas pressure after the elapse of the predetermined period of time is smaller than the hydrogen pressure after the elapse of the predetermined period of time, the controller is programmed to prohibit power generation of the fuel cell.

3. A fuel cell system,
wherein the fuel cell system comprises:
a fuel cell,
a fuel gas supplier for supplying hydrogen-containing fuel gas to the fuel cell,
a fuel gas supply flow path connecting a fuel gas inlet of the fuel cell and the fuel gas supplier,
a pressure sensor disposed in the fuel gas supply flow path,
a fuel off-gas discharge flow path for discharging, to an outside of the fuel cell system, a fuel off-gas discharged from a fuel gas outlet of the fuel cell,
a vent and discharge valve disposed in the fuel off-gas discharge flow path, and
a controller,
wherein the controller is preliminarily programmed to store a data group indicating a hydrogen pressure after an elapse of a predetermined period of time when a predetermined amount of hydrogen gas is supplied from the fuel gas supplier;
wherein the controller is programmed to determine whether or not a fuel gas pressure after the elapse of the predetermined period of time is smaller than the hydrogen pressure after the elapse of the predetermined period of time; and
wherein, when the controller determines that the fuel gas pressure after the elapse of the predetermined period of time is smaller than the hydrogen pressure after the elapse of the predetermined period of time, the controller is programmed to prohibit power generation of the fuel cell.

4. The fuel cell system according to claim 3,
wherein the controller is preliminarily programmed to store a data group indicating a relationship between, when the predetermined amount of hydrogen gas is supplied from the fuel gas supplier, an amount of supplied hydrogen gas and a hydrogen pressure increase rate;

wherein, when the controller determines that the fuel gas pressure after the elapse of the predetermined period of time is smaller than a predetermined threshold, the controller calculates a fuel gas pressure increase rate from a pressure change detected by the pressure sensor when the hydrogen-containing fuel gas is supplied to the fuel cell;

wherein the controller is programmed to determine whether or not the fuel gas pressure increase rate is smaller than the hydrogen pressure increase rate; and wherein, when the controller determines that the fuel gas pressure increase rate is smaller than the hydrogen pressure increase rate, the controller is programmed to prohibit power generation of the fuel cell.

\* \* \* \* \*